H. E. AND C. R. HAMILTON.
STOCK FEEDING DEVICE.
APPLICATION FILED MAR. 16, 1920.
1,352,513.
Patented Sept. 14, 1920.
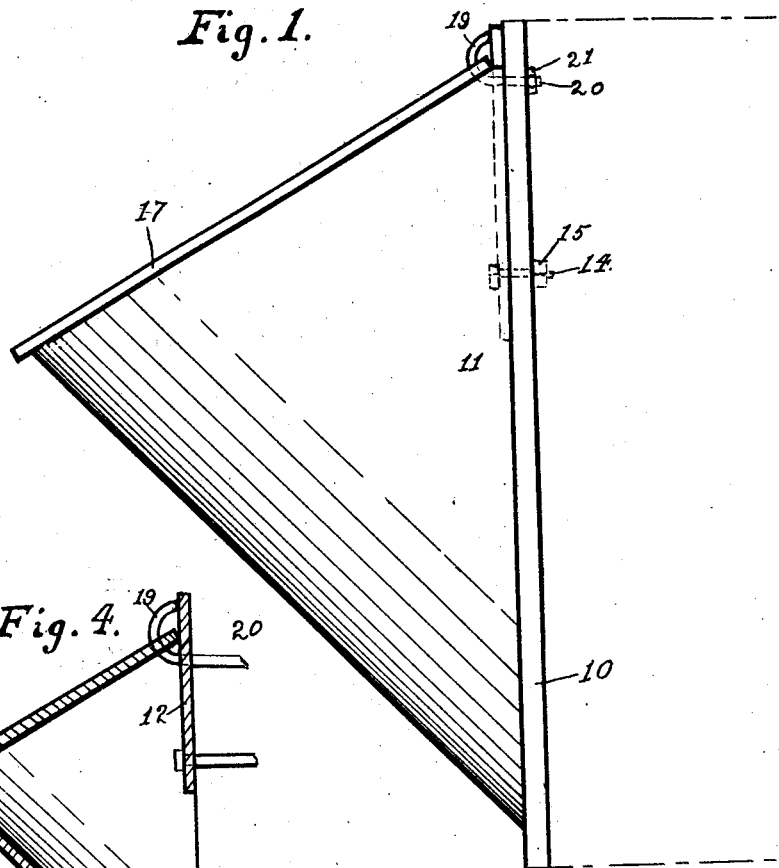
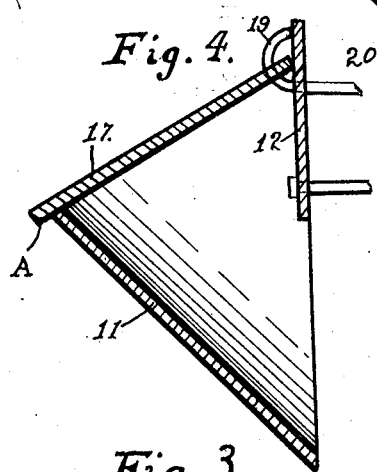
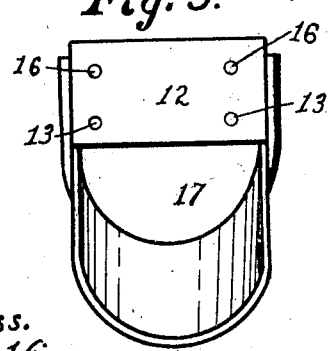
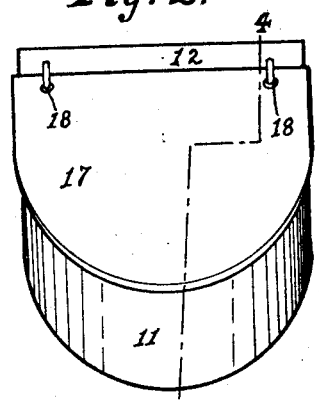
Witness.
Roy Kisor
Inventors
Herbert E. Hamilton
Clayton R. Hamilton
By. Orwig + Bair. Attorneys.

UNITED STATES PATENT OFFICE.

HERBERT E. HAMILTON AND CLAYTON R. HAMILTON, OF YALE, IOWA.

STOCK-FEEDING DEVICE.

1,352,513. Specification of Letters Patent. Patented Sept. 14, 1920.

Application filed March 16, 1920. Serial No. 366,410.

*To all whom it may concern:*

Be it known that we, HERBERT E. HAMILTON and CLAYTON R. HAMILTON, citizens of the United States, and residents of Yale, in the county of Guthrie and State of Iowa, have invented a certain new and useful Stock-Feeding Device, of which the following is a specification.

The object of our invention is to provide a stock feeding device of simple, durable and inexpensive construction.

More particularly it is our object to provide a stock feeding device in the form of an inclined trough, with means whereby this trough may be properly secured to a box or bin or other feed holding means in registry with an opening in said box or the like, which trough is provided with a movable cover adapted to normally close the trough and to be opened by the feeding animals.

A further object is to provide means for fastening the trough members to the box or the like by means of elements which also serve to pivotally support the cover.

With these and other objects in view our invention consists in the construction, arrangement and combination of the various parts of the device, whereby the objects contemplated are attained, as hereinafter more fully set forth, pointed out in our claim and illustrated in the accompanying drawings, in which:

Figure 1 shows a side elevation of our improved stock feeding device, mounted on a support.

Fig. 2 shows a front elevation of the trough.

Fig. 3 shows a rear elevation of the trough; and

Fig. 4 shows a detail, sectional view taken on the line 4—4 of Fig. 2.

In the accompanying drawings we have used the reference 10 to indicate generally a support, which may be one wall of a box or bin, which it will be understood, has an opening therein through which food may pass.

Our improved trough is mounted on the outside of the support 10 in position to register with such opening.

Our trough consists of a channel shaped member 11 inclined from its lower portion adjacent to the support 10, upwardly and outwardly as illustrated in Figs. 1 and 4.

At what may be called its rear end, the trough member 11 is substantially vertical, as shown in the drawings.

The upper, outer edge of the trough inclines from the upper end thereof, adjacent to the support 10, downwardly and outwardly, as shown.

The upper side edges of the trough proper are connected by a cross member 12, shown in Fig. 4, which projects upwardly against the body of the trough member 11, as illustrated in Figs. 1 and 4, and the rear surface of which is flush with the rear edges of the trough member 11, as shown particularly in Fig. 4.

In this connection it may be mentioned, that our trough as heretofore described, is preferably a single casting. The cross member 12 is provided preferably near its lower edge with spaced holes 13. Bolts 14 are extended through the holes 13 and through the support 10, and have on their inner ends nuts 15 for holding the feeding device snugly against the support 10.

In the cross member 12 near the upper edge thereof, and just below the topmost point of the side walls of the channel-shaped trough member 11 are holes 16 spaced from each other laterally as shown in Fig. 3

Resting upon the upper forward edge of the trough member 11 when the parts are in normal position is a pivoted or hinged cover member 17, the upper edge of which rests adjacent to the upwardly projecting portion of the cross member 12. (See for instance Fig. 4.)

Extended through suitable holes 18 in the cover member 17, near the upper edge thereof, are curved hook member portions 19 formed on one end of the bolts 20.

The bolts 20 are extended through the support 10 and have on their inner end a nut 21. The end of the hook member 19 is arranged to bear against the cross member 12 so that the hook members of the bolts 20 form curves or supports on which the cover member 17 is swingingly mounted, and which will permit the free movement of said cover member. The cover member 17 is of such size that it slightly overlaps the upper edge of the trough member 12, and projects beyond said upper edge, as indicated for instance at "A" in Fig. 4.

In the practical use of our improved stock feeding device it will be understood that the device is installed on a box or the like which contains feed, and the feed will flow into the trough member 11, until it reaches the lower edge of the member 12. The lower edge of the member 12 is slightly below the level of the lower portion of the upper forward edge of the trough member 11, so that feed will not flow out of the forward upper end of the trough member, but will cease movement when the trough member has been partially filled, until some of the food in the trough member has been eaten away.

The animals feeding from our device will lift up the cover member 17 and eat from the trough member. The cover serves to protect the feed from rain and the like, keeps out fowls, and is valuable in preventing waste of the food.

We desire particularly to call attention to the cheapness of our structure and to its simplicity, and to the fact that it is made as a unit which may be readily and easily installed on any box or bin or the like after a cutting of a feed opening.

Some changes might be made in the details of the structure of our device without departing from the real spirit and purpose of our invention, and it is our intention to cover such modifications in structure or use of mechanical equivalents, which may be reasonably included within the scope of our claim.

We claim as our invention:

A stock feeding device comprising a channel-shaped member having its bottom inclined from its lower rearward end upwardly and forwardly, and having its rear edge vertical, a cross member connecting the upper rear walls of said channel-shaped member, having its rear surface flush with the rear edges of said channel-shaped member, means for securing said channel-shaped member to a support, said cross member having a portion projecting upwardly above said channel shaped member, a cover for the upper forward portion of said channel-shaped member, and bolts extended through said cross member having hook portions formed on their forward ends extending through said cover, with their ends adjacent to the forward surface of said cross member.

Des Moines, Iowa, March 2, 1920.

HERBERT E. HAMILTON.
CLAYTON R. HAMILTON.